(12) United States Patent
Cipolla, Jr.

(10) Patent No.: US 11,601,000 B2
(45) Date of Patent: Mar. 7, 2023

(54) MOBILE DEVICE CHARGING APPARATUS INCLUDING A MECHANICAL WHEEL

(71) Applicant: POWER PULL GROUP INC., Elmont, NY (US)

(72) Inventor: Thomas Cipolla, Jr., Island Park, NY (US)

(73) Assignee: POWER PULL GROUP INC., Elmont, NY (US)

( * ) Notice: Subject to any disclaimer, the term of this patent is extended or adjusted under 35 U.S.C. 154(b) by 0 days.

(21) Appl. No.: 17/038,697

(22) Filed: Sep. 30, 2020

(65) Prior Publication Data

US 2021/0098999 A1    Apr. 1, 2021

Related U.S. Application Data

(60) Provisional application No. 62/908,334, filed on Sep. 30, 2019.

(51) Int. Cl.
*H01M 10/46*        (2006.01)
*H02J 7/00*         (2006.01)

(52) U.S. Cl.
CPC ........ *H02J 7/0044* (2013.01); *H02J 7/00034* (2020.01); *H02J 7/0047* (2013.01)

(58) Field of Classification Search
CPC ...... H02J 7/0044; H02J 7/0042; H02J 7/0047; H02J 7/32; H02J 7/00034; F21L 13/04; F21L 13/06; F21L 13/08

USPC ........ 320/107, 114, 115, 132, 101; 290/1 R, 290/42, 43, 53, 54
See application file for complete search history.

(56) References Cited

U.S. PATENT DOCUMENTS

| | | | |
|---|---|---|---|
| 8,093,731 B2 * | 1/2012 | Bulthaup | H02K 7/1853 290/1 R |
| 2015/0194833 A1 * | 7/2015 | Fathollahi | H02J 7/342 320/114 |
| 2015/0207360 A1 * | 7/2015 | Adams | H04B 1/3888 320/101 |

FOREIGN PATENT DOCUMENTS

| | | | | |
|---|---|---|---|---|
| CN | 205504587 U | * | 8/2016 | ............. F21L 13/08 |
| KR | 20060025334 A | * | 3/2006 | .......... H04M 1/0202 |

* cited by examiner

*Primary Examiner* — Edward Tso
(74) *Attorney, Agent, or Firm* — Sean R. Wilsusen, Esq.; KOS IP Law LLP

(57) ABSTRACT

A mobile device charging apparatus includes a mobile device case including an electrical adapter configured to connect with a charging port of a mobile device. An access port is in electrical communication with the electrical adapter. A mechanical wheel is positioned in the mobile device case. The mechanical wheel is in electrical communication with the electrical adapter. A tether is in communication with the mechanical wheel. The tether is configured to translate a mechanical force to the mechanical wheel to generate electricity. The mechanical wheel is configured to provide an electrical current to the mobile device to charge the mobile device.

13 Claims, 6 Drawing Sheets

MOBILE DEVICE CHARGING APPARATUS INCLUDING A MECHANICAL WHEEL

CROSS-REFERENCE TO RELATED APPLICATION

This U.S. Non-Provisional patent application claims priority to U.S. Provisional Patent Application No. 62/908,334, filed on Sep. 30, 2019, the disclosure of which is incorporated by reference herein in its entirety.

BACKGROUND

Technical Field

The present disclosure relates to a mobile device charging apparatus, and more particularly, to a mobile device charging apparatus including a mechanical wheel.

Discussion of Related Art

Mobile devices, such as Smartphones and Tablet computers employ rechargeable batteries configured to power the mobile devices. The rechargeable batteries are generally plugged into a source of electrical energy such as a wall outlet to charge the battery. As an example, daily charging of such rechargeable batteries is often necessary to provide the needed power to operate the mobile devices.

At times, such as during a power outage resulting from a natural disaster or flaws in an electrical grid, a source of electrical energy might not be available. For example, following a natural disaster, the power grid may be out for a period or days or weeks, or electrical power may be only intermittently available. Accordingly, the ability to charge mobile devices may be limited in such situations.

Thus, there is a need for a practical device for charging a mobile devices, such as Smartphones or Tablet Computers when traditional sources of electrical power are unavailable.

SUMMARY

In accordance with an aspect of the present disclosure, a mobile device charging apparatus includes a mobile device case including an electrical adapter configured to connect with a charging port of a mobile device. An access port is in electrical communication with the electrical adapter. A mechanical wheel is positioned in the mobile device case. The mechanical wheel is in electrical communication with the electrical adapter. A tether is in communication with the mechanical wheel. The tether is configured to translate a mechanical force to the mechanical wheel to generate electricity. The mechanical wheel is configured to provide an electrical current to the mobile device to charge the mobile device.

In some aspects, the mobile device is a Smartphone, Tablet, or Laptop Computer.

In some aspects, the access port is configured to connect accessory devices with the mobile device through the electrical adapter.

In some aspects, a handle is connected with the tether. The handle may be a ring. The ring may be shaped, dimensioned and positioned to embed in the mobile device case when not in use without protruding therefrom.

In some aspects, a crank indicator, such as a light, is configured to indicate when the electrical current is being provided to the mobile device to charge the mobile device.

In some aspects, a charge indicator light may indicate a plurality of charge levels of the mobile device.

In some aspects, a battery is positioned in the mobile device case. The battery is configured to store the electrical charge generated by the mechanical wheel. The battery may be electrically connected between the mechanical wheel and the electrical adapter. The battery may be configured to provide the electrical charge to the mobile device.

In some aspects, the battery may be a rechargeable lithium ion battery.

In some aspects, the mobile device case includes an upper housing and a lower housing. The upper and lower housings separate from each other to securely receive the mobile device in the mobile device case. A separation switch is configured to release the upper housing of the mobile device case from the lower housing of the mobile device case.

In some aspects, the mechanical wheel includes a reversing spring configured to bias the mechanical wheel toward a starting position. The reversing spring may be a torsion spring. The torsion spring may be positioned at a center of the wheel.

In some aspects, the torsion spring may be spaced apart from the center of the wheel and may include a second tether connected with a different part of the wheel from the tether.

In some aspects, the tether is configured to wind and unwind about the wheel in a reciprocal motion. The tether is configured to unwind from the wheel through an application of a first mechanical force applied to the tether by a user. The tether is configured to wind about the wheel through an application of a second mechanical force applied by the torsion spring.

BRIEF DESCRIPTION OF THE DRAWINGS

The accompanying drawings, which are incorporated in and constitute a part of this specification, illustrate embodiments of the present disclosure and, together with the detailed description below, serve to further explain the present disclosure, in which.

DETAILED DESCRIPTION

Figure 1:
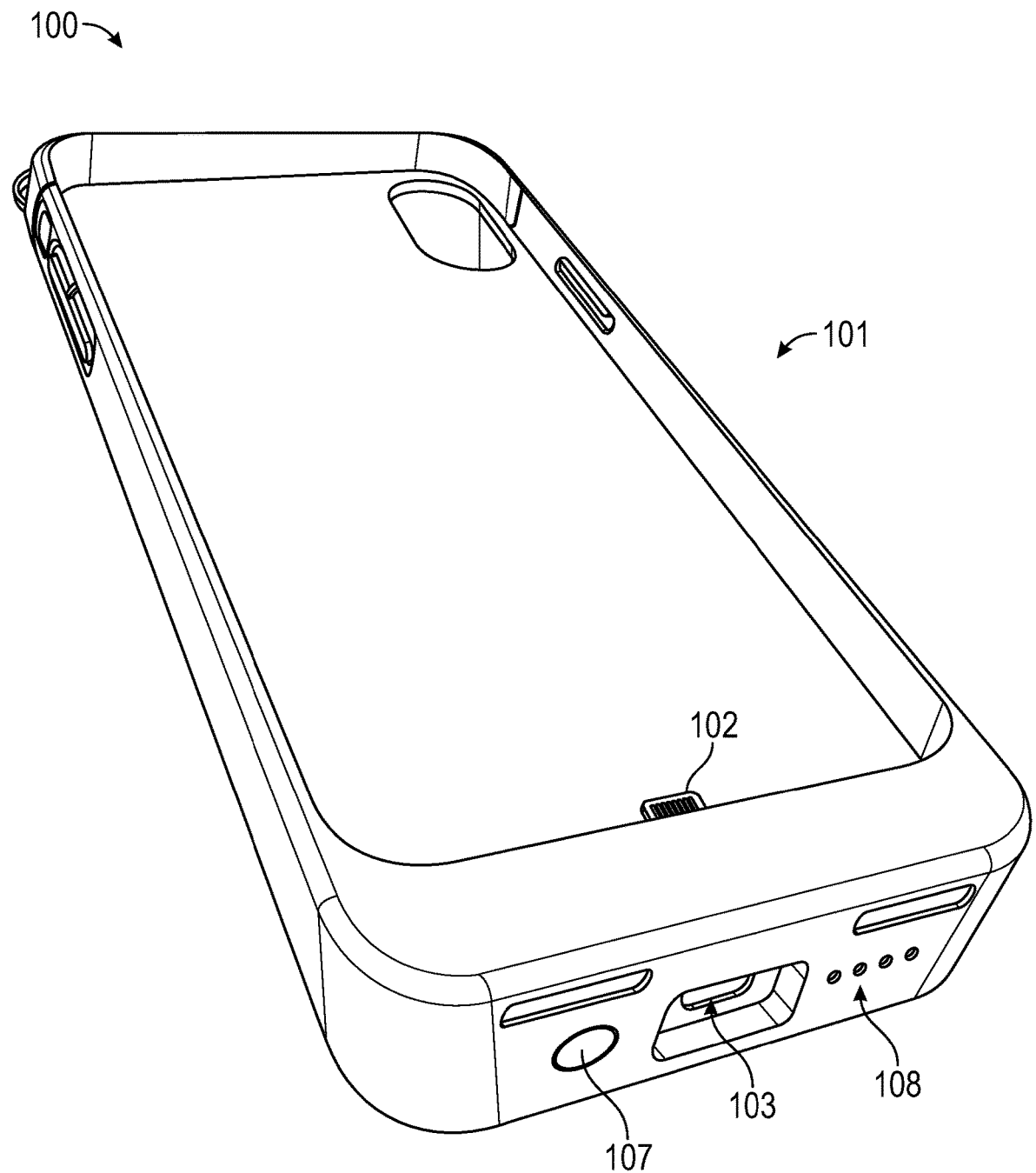
FIG. 1 is a first bottom perspective view of the mobile device charging apparatus according to an exemplary embodiment of the present disclosure.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The phrases "wheel" and "mechanical wheel" may be used interchangeably herein.

Figure 2:
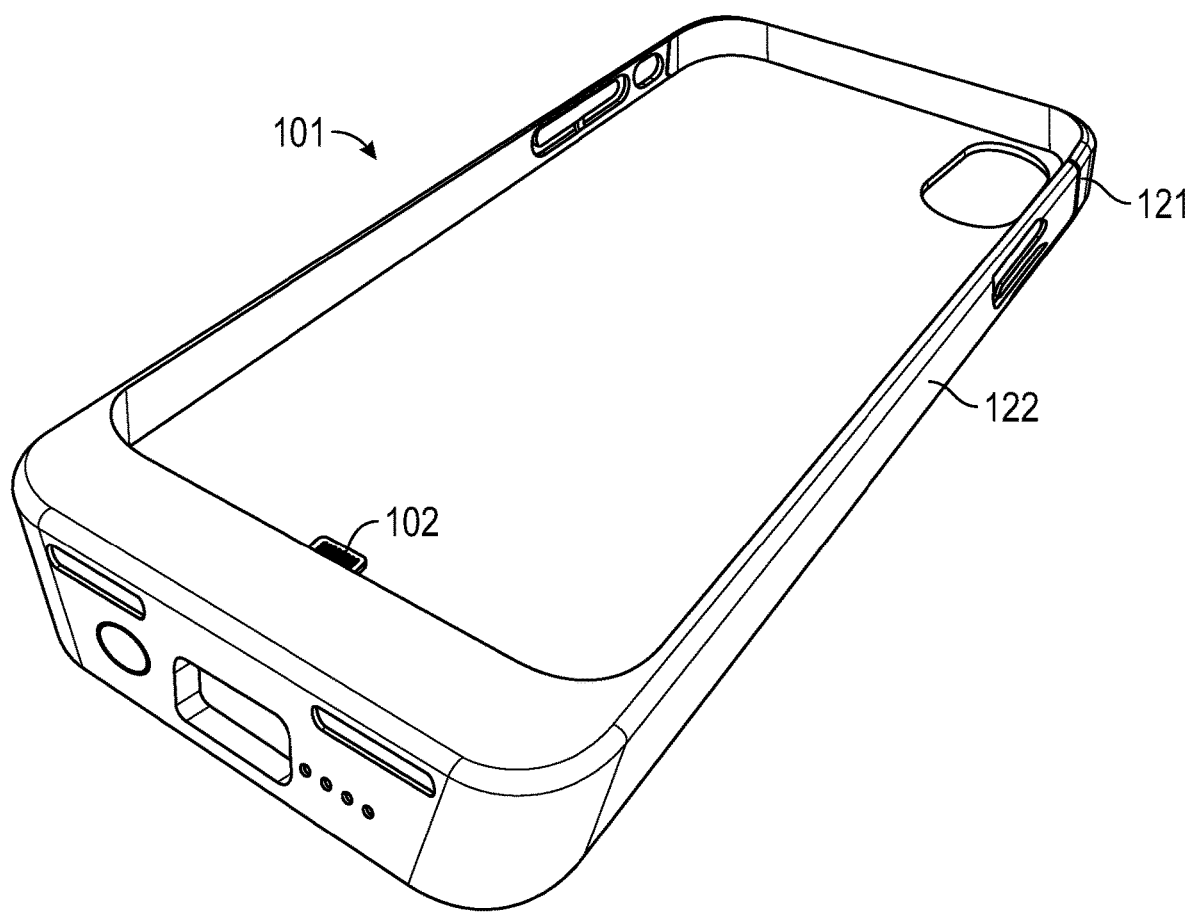
FIG. 2 is a second bottom perspective view of the mobile device charging apparatus according to an exemplary embodiment of the present disclosure.
Figure 3:
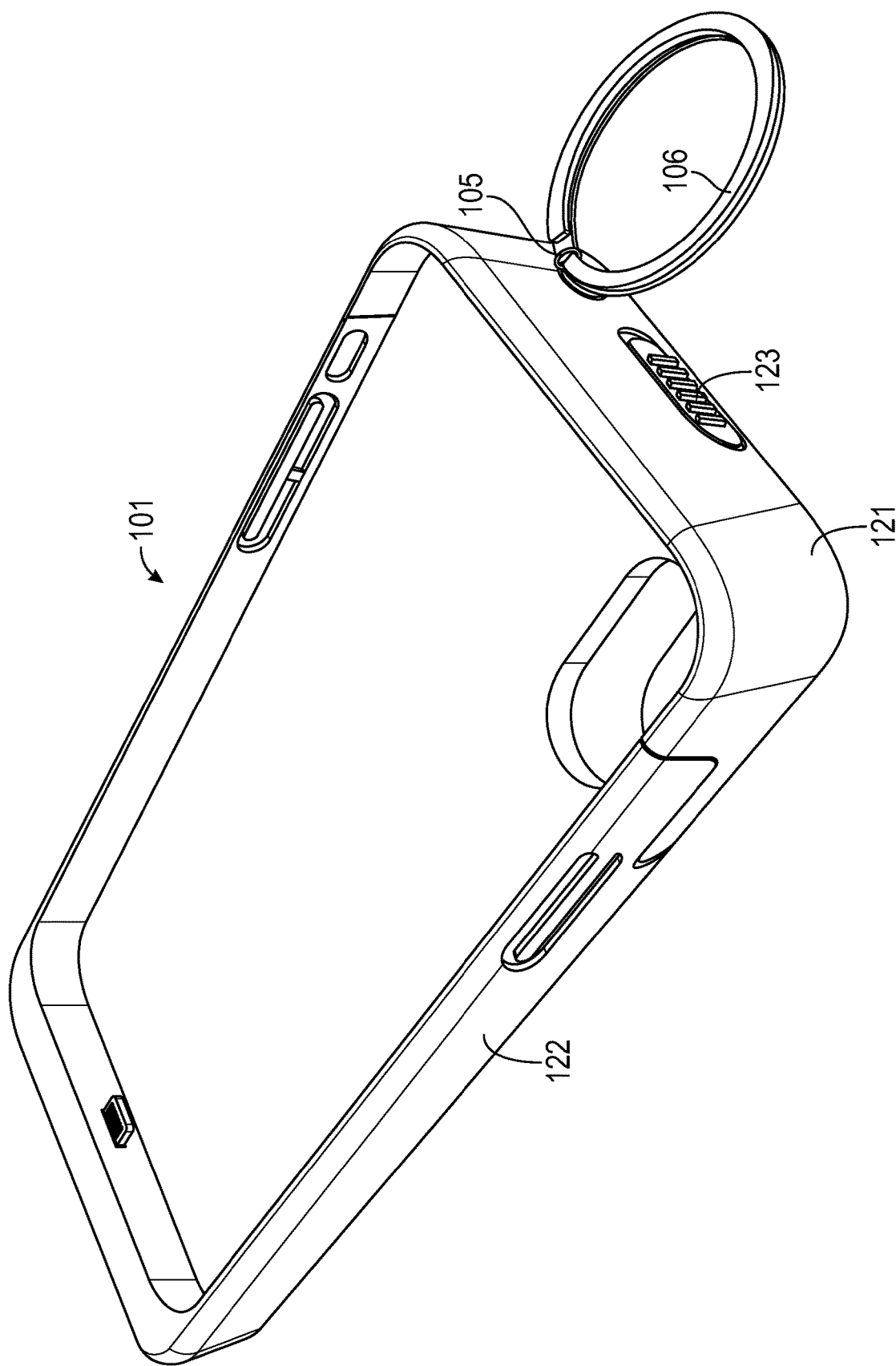
FIG. 3 is a top perspective view of the mobile device charging apparatus according to an exemplary embodiment of the present disclosure.
Figure 4:
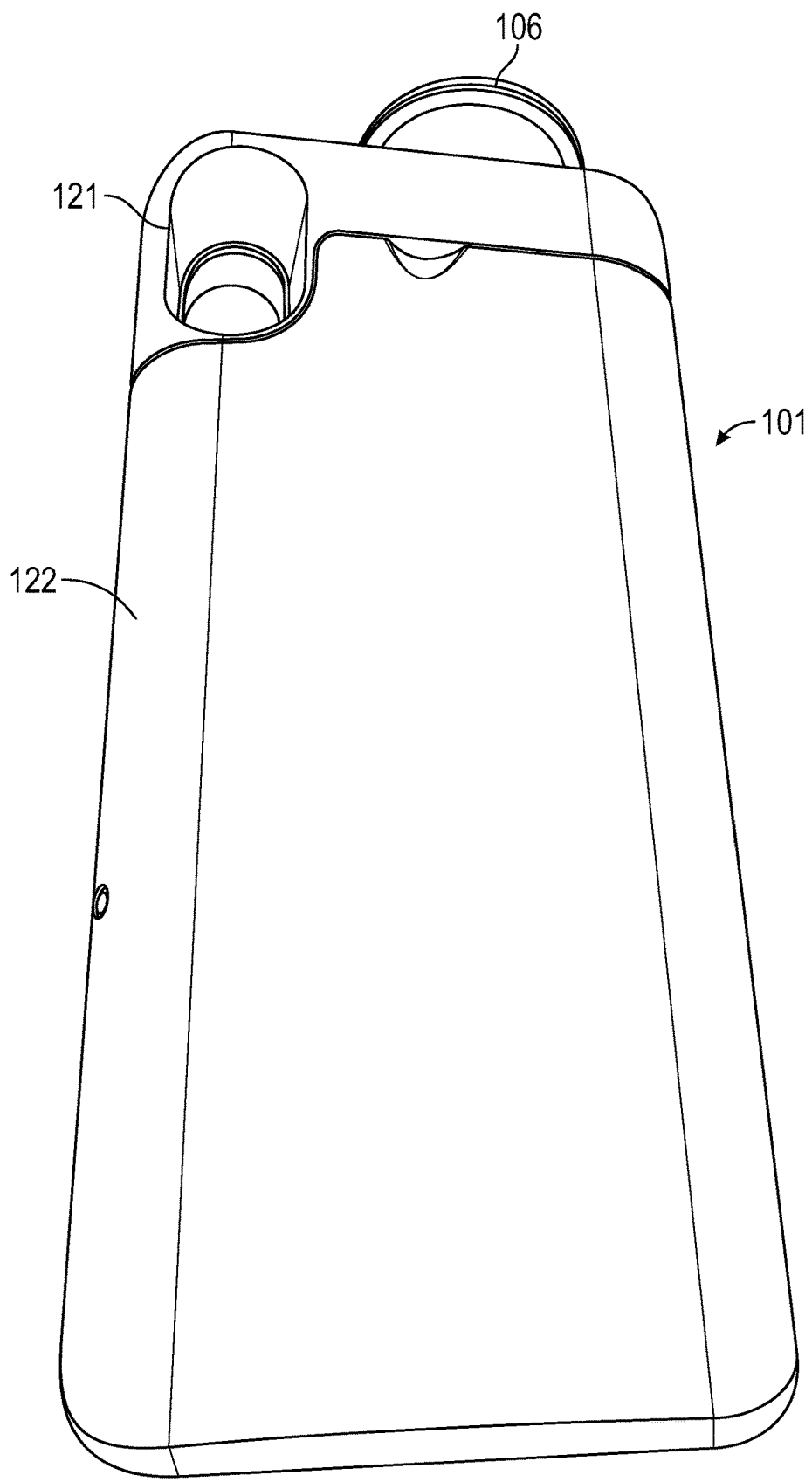
FIG. 4 is a rear plan view of the mobile device charging apparatus according to an exemplary embodiment of the present disclosure.
Figure 5:
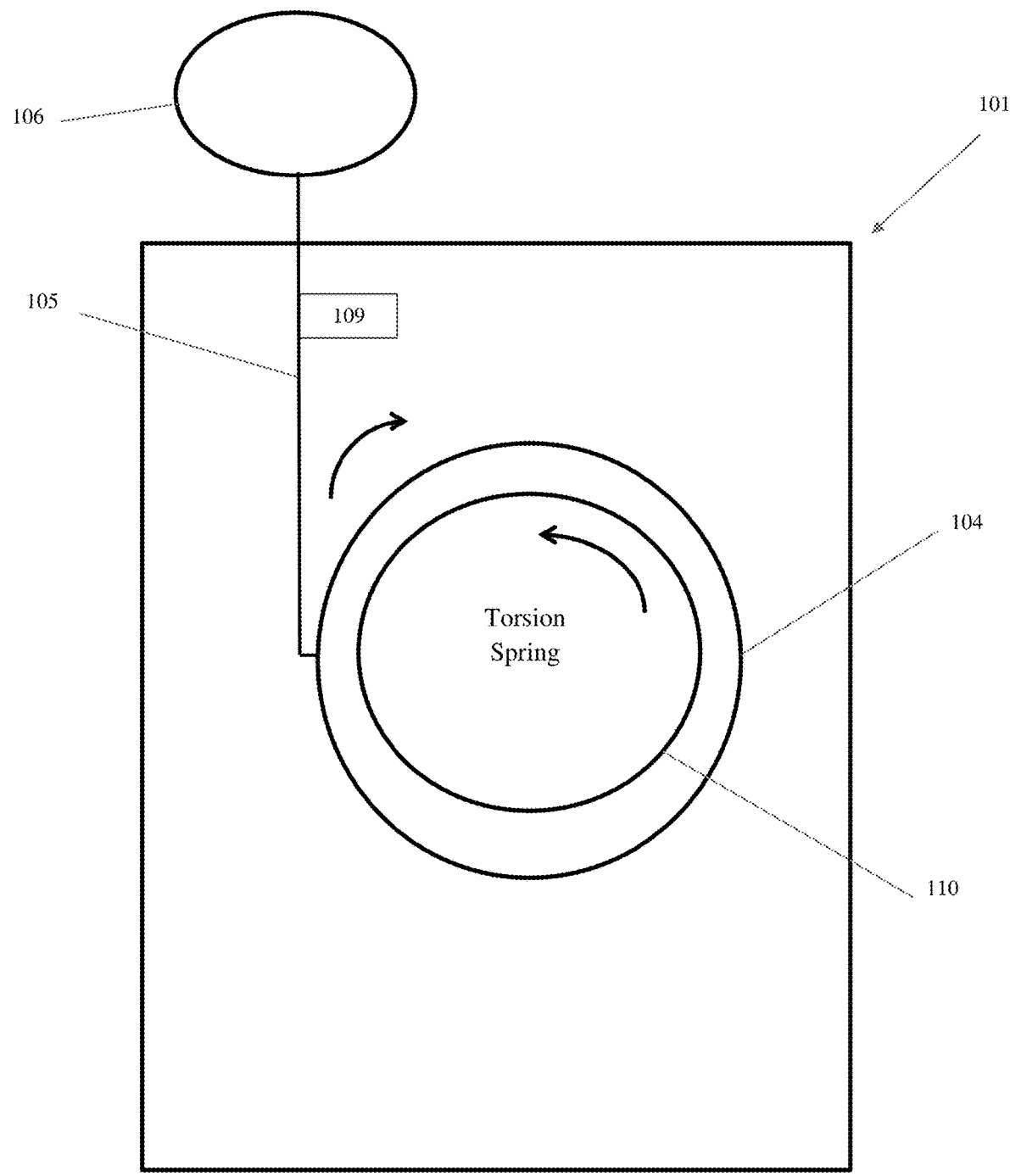
FIG. 5 is a first exemplary diagram of a mechanical wheel according to an exemplary embodiment of the present disclosure.
Figure 6:
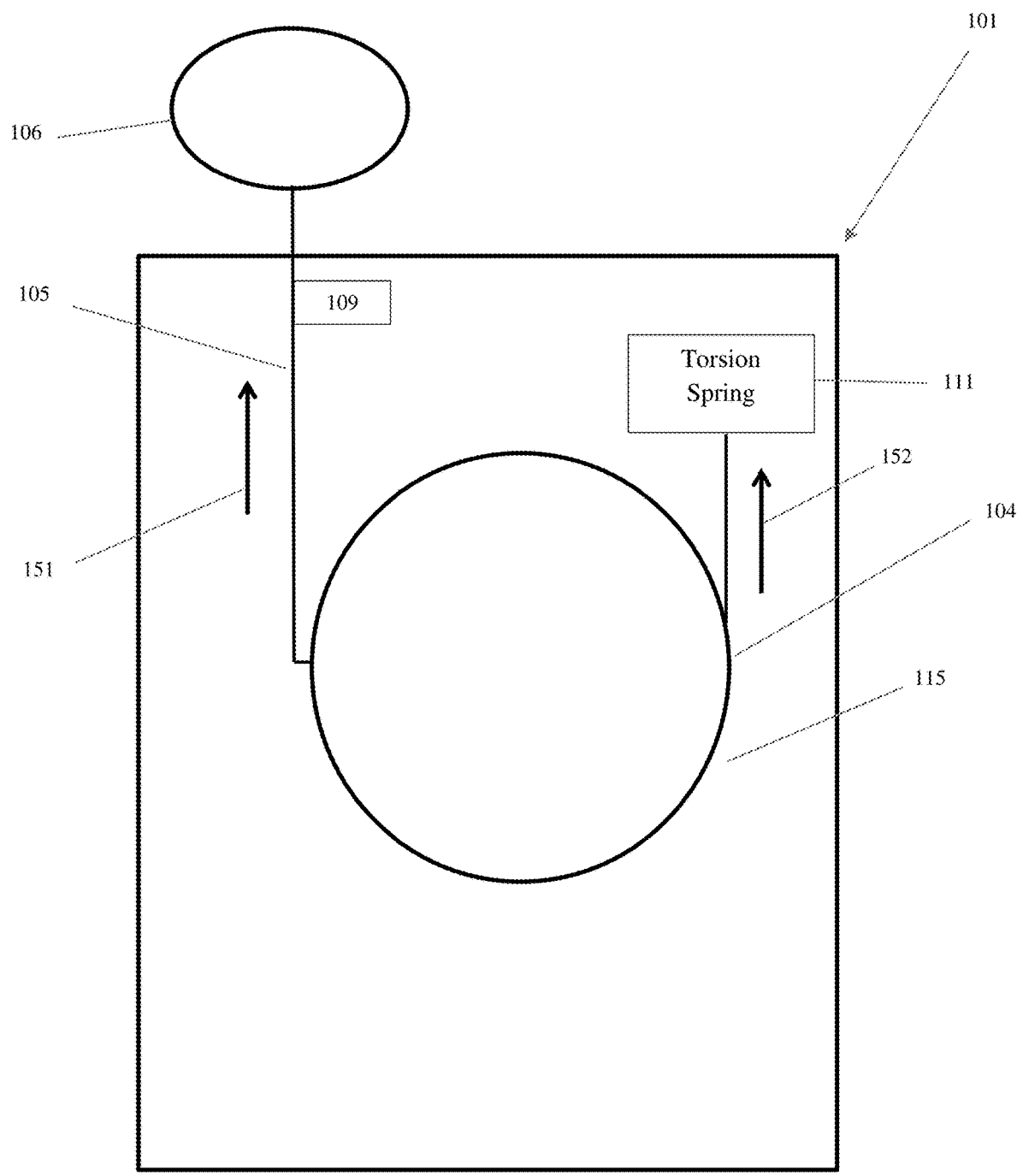
FIG. 6 is a second exemplary diagram of a mechanical wheel according to an exemplary embodiment of the present disclosure.

FIG. 1 is a first bottom perspective view of a mobile device charging apparatus 100 according to an exemplary embodiment of the present disclosure. FIG. 2 is a second bottom perspective view of the mobile device charging apparatus 100 according to an exemplary embodiment of the present disclosure. FIG. 3 is a top perspective view of the mobile device charging apparatus 100 according to an exemplary embodiment of the present disclosure. FIG. 4 is a rear plan view of the mobile device charging apparatus 100 according to an exemplary embodiment of the present disclosure. FIG. 5 is a first exemplary diagram of a mechanical wheel 104 according to an exemplary embodiment of the present disclosure. FIG. 6 is a second exemplary diagram of the mechanical wheel 104 according to an exemplary embodiment of the present disclosure.

Referring to FIGS. 1-6, according to an exemplary embodiment of the present disclosure, the mobile device charging apparatus 100 includes a mobile device case 101 including an electrical adapter 102 configured to connect with a charging port of a mobile device. An access port 103 is in electrical communication with the electrical adapter 102. A mechanical wheel 104 is positioned in the mobile device case 101. The mechanical wheel 104 is in electrical communication with the electrical adapter 102. A tether 105 is connected with the mechanical wheel 104. The tether 105 is configured to translate a mechanical force to the mechanical wheel 104 to generate electricity. That is, in use, by repeatedly pulling and releasing the tether 105 (e.g., by holding handle 106), a user can repeatedly crank the mechanical wheel 104 in a reciprocal motion (e.g., in a substantially circular rotation in forward and reverse directions) to generate an electrical current which is then passed on to the mobile device to charge the mobile device without the mobile device being plugged into a wall outlet or other standard charging source. This allows mechanical charging of the mobile device at any time, and without access to a traditional source of electrical power.

Thus, the mechanical wheel 104 may be repeatedly mechanically rotated by pulling the tether 105 to charge a mobile device connected with the mobile charging apparatus 100. This is particularly useful when access to electrical power, such as a wall outlet, is not available, such as following a natural disaster or in a region of the world in which an electrical grid is not consistently operational.

In an exemplary embodiment of the present disclosure, the mobile device is a Smartphone, Tablet, or Laptop Computer. For example, the mobile device may be stored in the mobile device charging apparatus 100 at all times, while still maintaining full operational access to all switches, and ports on the mobile device. This provides practical and always-available access to a charging solution for the mobile device. As illustrated, in FIGS. 1-4, all switches, ports, cameras, and the like remain accessible even when the mobile device is positioned in the mobile device charging apparatus described herein. For example, the access port 103 is configured to connect accessory devices with the mobile device through the electrical adapter 102.

In an exemplary embodiment of the present disclosure, a handle 106 is connected with the tether 105. The handle 106 may be a ring (see, e.g., FIG. 3); however, exemplary embodiments are not limited thereto. The ring may be shaped, dimensioned and positioned to embed in the mobile device case when not in use without protruding therefrom. For example, the tether 105 and the handle 106 may retract into an exterior wall of the mobile charging apparatus (e.g., an exterior wall of the upper housing 121) so as to not protrude from the mobile charging apparatus.

In an exemplary embodiment of the present disclosure, a crank indicator 107, such as a light, is configured to indicate when the electrical current is being provided to the mobile device to charge the mobile device. The light may include a plurality of lights indicating an amount of electrical energy that is being generated.

In an exemplary embodiment of the present disclosure, a charge indicator light 108 may indicate a plurality of charge levels of the mobile device. For example, charge indicator lights may indicate any predetermined charging levels from 0-100% charged.

In an exemplary embodiment of the present disclosure, a battery 109 is positioned in the mobile device case 101. The battery 109 is configured to store the electrical charge generated by the mechanical wheel 104. The battery 109 may be electrically connected between the mechanical wheel 104 and the electrical adapter 102. The battery 109 may be configured to provide the electrical charge to the mobile device. The battery 109 may continue to store power even after the mobile device is 100% charged and may provide additional power to the battery 109 as the mobile device is used. The additional power may be provided as a trickle, or may be accessed on-demand (e.g., through activation of a battery activation switch). Thus, mechanical power generated when the mobile device is fully charged may be stored for later use, or a second mobile device may be charged by being placed in the mobile device charging apparatus 100.

In an exemplary embodiment of the present disclosure, the battery 105 may be a rechargeable lithium ion battery. However, exemplary embodiments are not limited thereto, and alternative batteries may be employed.

In an exemplary embodiment of the present disclosure, the mobile device case 101 includes an upper housing 121 and a lower housing 122. The upper and lower housings 121, 122 separate from each other to securely receive the mobile device in the mobile device case 101. A separation switch 123 is configured to release the upper housing 121 of the mobile device case 101 from the lower housing 122 of the mobile device case 101.

In an exemplary embodiment of the present disclosure, the mechanical wheel 104 includes a reversing spring 110 configured to bias the mechanical wheel 104 toward a starting position. The reversing spring 110 may be a torsion spring (e.g., torsion spring 110 in FIG. 5 or torsion spring 111 in FIG. 6). The torsion spring 110 may be positioned at a center of the wheel 104 or the torsion spring 111 may be spaced apart from the wheel 104 and connected to the wheel by a second tether 115. The torsion spring (110 or 111) is configured to bias the mechanical wheel 104 to rotate in an opposite direction from a directly in which the tether 105 rotates the mechanical wheel 104.

In an exemplary embodiment of the present disclosure, the torsion spring 111 may be spaced apart from the center of the wheel and may include the second tether 115 connected with a different part of the wheel from the tether. The second tether 115 may be entirely concealed within the mobile device case 101 and might not be visible from outside the mobile device case 101.

In an exemplary embodiment of the present disclosure, the tethers (e.g., 105 and/or 115) is/are configured to wind and unwind about the wheel 104 in a reciprocal motion. The tether 105 is configured to unwind from the wheel 104 through an application of a first mechanical force 151 applied to the tether 105 by a user. The tether 105 is configured to rewind about the wheel 104 through an application of a second mechanical force 152 applied by the torsion spring (110 or 111) to the mechanical wheel 104.

The handle 106 may be repeatedly pulled and released to mechanically generate electrical energy in both extending and retracting directions, thus maximizing power generation efficiency.

Applicant has made the unexpected discovery that continually applying a mechanical force to the mechanical wheel 104 by repeating pulling and releasing the tether 105 can charge a mobile device such as a smartphone from about 1% charged to about 99% charge in approximately 60 minutes. This rate of charging exceeds the rate of charging found when a Smartphone is connected to a wall outlet using a standard USB adapter. Thus, the mobile charging apparatus 100 described herein provides a benefit of reduced charging time, as compared with traditional wall charging methods.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A mobile device charging apparatus, comprising:
    a mobile device case including an electrical adapter configured to connect with a charging port of a mobile device;
    an access port in electrical communication with the electrical adapter;
    a mechanical wheel positioned in the mobile device case, the mechanical wheel in electrical communication with the electrical adapter;
    a torsion spring positioned within the mechanical wheel, the torsion spring configured to bias the mechanical wheel toward a starting position;
    a tether in communication with the mechanical wheel, wherein the tether is configured to translate a mechanical force to the mechanical wheel to generate electricity, and
    wherein the mechanical wheel is configured to provide an electrical current to the mobile device through the electrical adapter to charge the mobile device; and
    a crank indicator configured to indicate when the electrical current is being provided to the mobile device to charge the mobile device, wherein the crank indicator includes a plurality of lights indicating an amount of electrical energy that is being generated by the mechanical wheel.

2. The apparatus according to claim 1, wherein the mobile device is a Smartphone, Tablet, or Laptop Computer.

3. The apparatus according to claim 1, wherein the access port is configured to connect accessory devices with the mobile device through the electrical adapter.

4. The apparatus according to claim 1, further comprising a handle connected with the tether.

5. The apparatus according to claim 4, wherein the handle is a ring.

6. The apparatus according to claim 5, wherein the ring is shaped, dimensioned and positioned to embed in the mobile device case.

7. The apparatus according to claim 1, further comprising a charge indicator light indicating a plurality of charge levels of the mobile device.

8. The apparatus according to claim 1, further comprising a battery positioned in the mobile device case, the battery configured to store the electrical charge generated by the mechanical wheel.

9. The apparatus according to claim 8, wherein the battery is electrically connected between the mechanical wheel and the electrical adapter, the battery configured to provide the electrical charge to the mobile device.

10. The apparatus according to claim 1, wherein the mobile device case further includes an upper housing and a lower housing, the upper and lower housings configured to separate from each other to securely receive the mobile device in the mobile device case.

11. The apparatus according to claim 1, wherein the mobile device case further includes a separation switch configured to release the upper housing of the mobile device case from the lower housing of the mobile device case.

12. The apparatus according to claim 1, wherein the torsion spring is positioned at a center of the mechanical wheel.

13. The apparatus according to claim 12, wherein the tether is configured to wind and unwind about the wheel in a reciprocal motion, the tether configured to unwind from the wheel through an application of a first mechanical force applied to the tether by a user, and the tether configured to wind about the wheel through an application of a second mechanical force applied by the torsion spring.

* * * * *